United States Patent [19]

Deffeyes

[11] 4,281,043

[45] Jul. 28, 1981

[54] POLYMODAL MAGNETIC RECORDING MEDIA AND COMPOSITIONS USEFUL THEREIN

[75] Inventor: Robert J. Deffeyes, Arlington, Tex.

[73] Assignee: Graham Magnetics, Inc., North Richland Hills, Tex.

[21] Appl. No.: 859,962

[22] Filed: Dec. 12, 1977

Related U.S. Application Data

[63] Continuation-in-part of Ser. No. 411,253, Oct. 31, 1973, and a continuation-in-part of Ser. No. 734,605, Oct. 21, 1976, abandoned.

[51] Int. Cl.$^3$ .......................... B22F 3/00; C04B 35/64; H01F 1/04; H01F 1/14
[52] U.S. Cl. ................................. 428/457; 252/62.54; 252/62.55; 252/62.56; 428/900; 428/694
[58] Field of Search ............................ 427/127–132; 428/900, 457, 538, 539; 252/62.54, 62.55, 62.56

[56] References Cited

U.S. PATENT DOCUMENTS

| | | | |
|---|---|---|---|
| 3,219,353 | 11/1965 | Prentky | 360/131 |
| 3,328,195 | 6/1967 | May | 428/636 |
| 3,413,141 | 11/1968 | Friedman | 427/48 |
| 3,566,356 | 2/1971 | Holm | 235/449 |
| 3,627,580 | 12/1971 | Krall | 427/48 |
| 3,653,962 | 4/1972 | Akashi et al. | 428/960 X |
| 3,681,138 | 8/1972 | Ankenbrand et al. | 427/48 |
| 3,986,205 | 10/1976 | Fayling | 360/2 |

Primary Examiner—Bernard D. Pianalto
Attorney, Agent, or Firm—Robert A. Cesari; John F. McKenna; Andrew F. Kehoe

[57] ABSTRACT

Polymodal magnetic information-recording articles formed with at least two different populations of magnetic powders, whereby at least one of the powders, being of lower intrinsic coercivity and forming means to accept a noise interference pattern, accepts a pattern which serves as a means to verify the authenticity of, or means to detect previous tampering with, the magnetic recording device. More generally, the disclosure relates to polymodal recording media characterized by incorporation of a plurality of independently-erasable ferromagnetic powder populations and processes for making and using said media. Particular advantage is disclosed for such media having a relatively small ratio of coercivity between easier and harder axis and for material wherein shape anisotropy is absent from adjacent modes in a polymodal system.

27 Claims, 29 Drawing Figures

POLYMODAL MAGNETIC RECORDING MEDIA AND COMPOSITIONS USEFUL THEREIN

RELATED APPLICATIONS

This application is a continuation-in-part of Ser. No. 411,253, filed Oct. 31, 1973, by Robert J. Deffeyes and a continuation-in-part of Ser. No. 734,605, filed Oct. 21, 1976, by Mr. Deffeyes now abandoned. The latter application was also a continuation-in-part of the former.

BACKGROUND OF THE INVENTION

Automatic information reading from bank credit cards, transportation fare cards, and like objects is rapidly gaining acceptance as the society moves towards a "cashless" money system. The information is usually placed, visibly or invisibly, on an article and read by mechanical means, by light-detection means or by magnetic-sensing means. For example, the so-called magnetic-strip credit cards or fare cards are particularly attractive because of their ease of manufacture. Unfortunately, this type of card has been demonstrated to be easily counterfeited. Despite this known fact, the convenience of the "magnetic strip" approach has caused the American Bank Association to pick the magnetic strip as its standard for bank credit plans.

In other magnetic recording systems, it is also desirable to have some means of building more security into the system. For example, knowledge of a code key would be useful in screening access to information stored on magnetic tape. This code key might be mechanical or electrical according to known procedures. But, such systems would not adequately discriminate between persons who are allowed access to some tapes but not allowed to retrieve information on other tapes. It would be convenient if each package of information, say each magnetic tape in a given library, held a code signal which had to be recognized by the retriever before being erased to reveal the primary information on the tape. It would be further convenient if the code could be changed from time to time as the authorized personnel change.

In general then, it would be convenient to provide magnetic recording media capable of carrying two independent signals in the same recording area and, advantageously as powders within the same matrix resin.

Previously it has been known, or at least alleged to have been known, to make multi-layer bimodal magnetic tapes using thin films of plated metal. Such recording media, disclosed in U.S. Pat. Nos. 3,328,195 and 3,219,353 to May and Prentky, give little or no evidence that any high performance bimodality was achieved. In any event, manufacture of the May and Prentky products require relatively expensive, multi-layer construction and also utilize metallic films, the formulation and design of which are not only very complex and expensive, but depend for their magnetization upon different considerations, e.g. the controlled movement of domain walls, than do magnetic particles dispersed in a resin matrix. Moreover, such films are not readily varied as to composition and are not believed as susceptible to enhancement of recording properties by use of bias currents because eddy currents seem to be induced, possibly because of the relatively high conductivity of metal films.

Other deficiencies in the bimodal materials of Prentky and May are the necessity of using very large coercivity differences. Trimodal or quatramodal media become economically and technically impractical using their processes and product.

Moreover, it appears that Prentky and May had no idea that materials, or at least those exhibiting substantial shape anisotropy could be used in polymodal materials. The Prentky and May materials exhibit little or no shape anisotropy although they exhibit a great deal of magnetic interaction because of the nature of domain-wall-modulated magnetic recording.

It is further noted that in an article entitled *"The Effect of Particle Interaction on the Coercive Force of Ferromagnetic Micropowders"* (Proceedings of the Royal Society, A, 232 (1189), pages 208–226, 1955), Wohlfarth discloses that "the change of coercive force with packing is negligible for powders controlled by magnetocrystalline anisotropy . . . but is significant for particles controlled mainly by shape anisotropy." This statement is related to the present invention only by a hindsight search for a theory by which to further explain some of the unexpected and advantageous attributes of the products of the invention.

In further hindsight review of art bearing some relationship to fields relating in some superficial structural or utilitarian aspect to the invention, the following art was located:

U.S. Pat. No. 3,601,913 to Pollock suggests a device utilizing a mixture of high and low coercivity materials. The utility of this system depends on the detection of magnetic voids caused by mechanical displacement of magnetic powder bearing surfaces. Pollock also suggests that use of such mixtures will make card counterfeiting more difficult. But Pollock uses his mixture only to complicate the manipulative acts of duplicating a card; the individual components serve no distinct functions except in instances wherein they are at least partly non-congruent so that they yield a visually-identifiable pattern or a geometrically distinct identifying pattern formed of one of the magnetic powders. In general, the powders simultaneously resond to the field as a single-population powder would.

Moreover, the chromium oxide and iron oxide mixture of the Pollock patent would be inoperable in forming combinations for use in such processes as are to be described below.

U.S. Pat. No. 3,790,754 to Black teaches use of adjacent ferromagnetic coatings to achieve a multi-modal, but relatively insecure magnetic recording system. The system is generally similar to Pollock's system.

In recently-issued U.S. Pat. No. 3,761,311 to Perrington et al, there is described a dual layer magnetic tape, each layer having different nominal coercivities. It is believed that such a tape is sold under the trade designation Scotch Brand C-60 Cassette Cobalt-Energized High-Energy Type (Catalog Number S-C-60ME) by 3M Company. That tape is not bimodal, probably because magnetic interaction substantially prevades the ultra-thin layer of the tape. Moreover, since it was developed for, and is sold to, a specific audio recording market, it is clearly not intended for, nor tolerant of any substantial bimodal character.

In the following description, the term "card" will be used in the same sense of a mechanical equivalent of any article which carries magnetic material in information-yielding arrangement. It will be obvious that the scope of the kinds of members which can be tagged with magnetic identification means is very broad and that such recording members are mechanical equivalents to the credit card referred to in this application.

Also, U.S. Pat. Nos. 3,986,205 and 3,986,206 to Fayling, based on applications filed subsequently to the parent application of Applicant, describe a special mode of bimodality whereby particular magnetic particles such as barium ferrite are utilized in a particular way to form bimodal materials. Barium ferrite is a peculiar material exhibiting a very high coercivity in one direction in comparison to the coercivity exerted in a direction normal thereto. The coercivity ratio is about 2.5:1 whereas the ratio in most magnetic materials is below 1.5:1 and usually about 1.25:1. This large difference in coercivity allows Fayling, using special processing procedures, to achieve a kind of polymodal system, or so these patents indicate.

Fayling utilizes his barium ferrite and like materials as one component of a polymodal system. Faylings's polymodal recording media cannot be processed in the usual way, i.e. using a single ring type erase-head of the type normally used in the magnetic recording art. This is true with respect to tape processing. Moreover, a spatially large erase field must be used in processing a credit card-sized object by the Fayling system.

Finally, Fayling's system does not appear to be useful on magnetic discs without the development of wholly new processing procedures.

It should also be noted that both operable powder populations of Fayling are believed to exhibit shape anisotropy. This is a consequence, it is believed, of chip-like barium ferrite flakes (normally not having shape anisotropy) aligning themselves into a "stack" formed of a plurality of the chips when they are mixed and oriented in a polymer matrix.

U.S. Pat. No. 3,566,356 to Holm et al discloses some magnetic recording media using two magnetic materials in the same composition. However, the purpose of these inventions is to provide a positive interaction between the two populations to assure a characteristic and distinctive coercivity characteristic. Holm et al also appear to disclose some two-layer particulate magnetic materials which seem to be capable of some bimodal performance. This Holm et al bimodality requires a difference in coercivity but the characteristic is achieved by cross-orienting two layers of iron oxide.

SUMMARY OF THE INVENTION

It is a principal object of this invention to provide novel multi-modal ferromagnetic recording members. It is also an object of the invention to provide a magnetic information bearing credit card which is relatively difficult to counterfiet, or duplicate surreptitiously in such a way as to allow misuse of the counterfeit or duplicate card.

It is a further object of the invention to provide a means to warn a magnetic-card holder that his card has been subject to tampering.

Another object of the invention is to provide a process for making a counterfeit-proof credit card.

Still another object of the invention is to provide novel processes for verifying and reading a credit card.

A further object of the invention is to provide novel apparatus for reading and verifying a credit card.

Another object of the invention is to provide a novel magnetic composition particularly useful in making the credit card of the invention.

It is an object of the invention to provide polymodal recording media such as magnetic tapes, credit cards and discs which contain magnetic populations which can be readily erased with conventional erase means and with conventional erasing procedures.

It is another object of the invention to provide polymodal recording media having conventional ratios of coercivity along different crystalline axis, i.e. ratios of less than 1.5:1 between axis normal to one another.

Other objects of the invention will be obvious to those skilled in the art on reading this application.

Applicant's invention is based on the use of a magnetic identification medium formed of at least two distinct populations of ferromagnetic powders, wherein a first population is selected so that it can be magnetically switched, i.e. recorded upon, by a magnetic field at which a second population will not be switched. Each population is also responsive to differing stimuli, say differing magnetic fields or temperatures, for erasing information therefrom; that is, magnetic information can be retained by one population as magnetic information is erased from another population. The term "mixture" as used above is with respect to the "mix" of particles sensible by a magnetic recording device.

In a typical procedure, a magnetic strip of a credit card will be formed of powders of 200 and 800 oersted coercive force respectively. It is believed one of the powders should be such that its coercive force is not substantially affected by any shape anisotropy characteristic of the particle. These powders are intermixed and dispersed in a polymeric matrix according to manipulative procedures well known in the magnetic-information-recording art. The resulting mixture is used to form the strip of a credit card.

A relatively high magnetic field, say a 300 oersted field, is used to record the primary functional information on the credit card. All particles would respond to such a recording field. Next, however, a 300 oersted recording field is used to record a "noise" signal on the lower-coercivity material only and across the strip. The noise signal will be sufficiently strong to mask the primary functional information on the credit card.

In the better practice, recording fields proportioned to the coercivity of each mode might be used to record each mode. A high frequency bias with an amplitude equal to the respective coercivities allows one to set, independently, signal levels for each mode.

In applications which warrant such cautionary procedures, a noise signal should have peak and zero-crossing statistics which are the same as a primary signal to be masked by the noise. This is to avoid the signals being filtered out from one another by computer-aided analog or digital filtering techniques. The theory and techniques for handling of such noise statistics is known in the art. See *Information Transmission, Modulation and Noise* by Schwartz (McGraw-Hill, New York, 1959).

According to the system of the invention, the card of the invention is advantageously utilized with a verifying and recording device, the following events occur.

1. The card would be checked for the presence of the noise signal.

2. If the noice signal is absent, the card would be erased and thereby permanently invalidated; if the noise is present, proceed to Event 3.

3. The noise signal only would be erased* by, a 3000 oersted alternating current field.

*By erased, is meant erased to the extent that it no longer effectively masks the high-coercivity signal.

4. Then the primary functional information recorded at the 3000 oersted field would be read by the machine.

5. The appropriate noise signal would once again be recorded to mask the primary functional signal.

If the card is rejected at Event 2, the user would have reason to suspect that the card had been tampered with, at, or since its last use. It should be noted that the above sequence can be varied depending on the business policy of the organizations involved. For example, it might be desirable to proceed through some reading information on the card before erasing it. Such a procedure would facilitate location of the prior billing status and, perhaps, the site of repeated tampering activity. Moreover, in specific locations where any substantial number of people may come in contact with erase fields during their employment or otherwise, it might be prudent to accept the billing before invalidating the card and so informing the card holder of the prospective invalidity of his card. Those skilled in the art and faced with particular business problems will, no doubt, think of other situations making certain function-sequencing procedures desirable.

In appropriate circumstances, three or more distinct powders can be used. Two of the powders might function as described above, while another powder, say one with a coercivity of 1100 or so could be checked for other information, say a maximum charge limit or the like.

Another variaion, or utility, which can be imparted to a card would be that different card issuers would have different noise signals and a card bearing a signal recognized as legitimate, but not authorized at the particular charging station, would be rejected but without erasing the authorized signal.

As an alternative to Event 4 listed above, one can "read" the signal by means of anhysteretic duplication. In this situation an ordinary, iron-oxide-type magnetic tape could be erased and then placed in contact with the card of the invention. The signal from the high coercivity material on the card would transfer to the ordinary tape after the erasure of the noise signal. The ordinary tape could then be used to store transaction information for later transfer to a reading apparatus, say at a computer center. For the purposes of this application, a common magnetic tape so employed is meant to be included within the definition of the term "reading means".

It is also contemplated that the systems of the invention can be utilized in conjunction with other security procedures. For example, different populations could be recorded and read with the recording and reading heads mounted at different angles to the path of the magnetic recording medium.

The present invention may also be utilized with a variable erase head reading machine whereby one (a) puts in a tape, say from a tape library available to certain people, only some of whom you want to be able to read certain tapes; and (b) tells the machine, electronically by a code known to him, what coercivity and what pattern of noise must be erased to read the information. If he uses the wrong code, the machine refuses to proceed (or actuate a alarm, or whatever); if he is an authorized person, i.e. he has the correct code, he can read the tape because the machine checks for the indicated noise signal, erases it, etc.

Powders useful in the invention can be selected from a large number known to the art. In general, the high coercivity powders are conveniently cobalt-containing metal powders having an intrinsic coercive force of about 500 to 1100 or more. Materials of this type are commercially available from The Cobaloy Company, a division of Graham Magnetics, Inc. The powders having the lower coercive forces are conveniently gamma $Fe_2O_3$ powders of intrinsic coercive force of about 350 or below. Such iron oxide powders are readily available from the several suppliers presently supplying pigments for audio and video tape manufacture.

Other useful powders are those such as the stabilized chromium dioxide powders of the type sold under the trade designation Crolyn by E. I. DuPont and Company. When selected as the lower coercivity powder, this material can have a noise signal erased conveniently by a heating means, because its curie point is only abut 130° C.

Chromium dioxide is a possible substituent for all or some of the preferred low-coercivity iron oxide. However, a chromium dioxide-base material having a coercivity of about 400 also could be used as the higher coercive-force component with a low coercivity ferromagnetic metal powder.

Another important advantage of chromium dioxide is that it may be used with a relatively small amount of high-coercivity material because, after being erased thermally, it will, on cooling, tend to switch in a pattern dictated by the high coercivity material, thereby increasing the signal recorded thereon.

There are also some iron-oxide-based materials, e.g. cobalt-doped gamma $Fe_2O_3$ and $Fe_3O_4$ which can be used as the low-coercivity material when used in accordance with the teachings of this disclosure.

In general, it is desirable to have populations in a bimodal system characterized by coercivity values have a difference of at least 200. In practice, bimodal systems may be selected to have differences of 100 or greater. If additional functionality is built into a ferromagnetic system by adding different modes, the higher and lower coercivities will usually differ by at least a factor of 200 $(X-1)$ wherein X is the number of modes, and it will be advantageous to keep the coercive force difference between the different populations at 200 oersteds or more. However, it is to be emphasized that excellent polymodal performance can be obtained with smaller differences in coercivity, say differences as low as 150 oersteds or even less depending on the demands of a paticular application.

The geometry of the powders selected for use in multimodal magnetic recording media prepared according to the invention will advantageously be selected with respect to the particular utility for which the media are intended. Thus, at least one acicular powder tending to orient strongly will be preferred in magnetic tape application, but square or round particles are entirely suitable for such applications as magnetic discs. It is theorized that at least one of the magnetic materials of the adjacent modes must have no substantial shape anisotropy, i.e. its coercive force should be largely controlled by crystalline anisotropy as are the Cobaloy materials described herein.

The discovery that certain combinations of powders can be utilized in achieving such distinctly polymodal ferromagnetic systems is unexpected in view of the performance of mixtures formed of the ferromagnetic powders most generally used in the art. For example, a mixture formed of a first iron oxide, a second iron oxide and cobalt-based metal powders having coercivities of 180, 320 and 1000, respectively, yielded a low coercivity peak which was not distinct although there were distinct peaks between the low coercivity materials and the high coercivity material.

The above result may be partly understood in view of the teaching that the peaks should be about 200 oersteds apart. However, the two low coercivity powders interact more than would be expected on the sole basis of the insufficient difference in coercivities. The result is probably due to the fact that shape-anisotropic materials tend to change coercivity in the presence of interaction fields from other materials exhibiting substantial shape anisotropy.

It has been noted that mere differences in powder coercivity will not allow indiscriminate manufacture of polymodal recording products. For example, trimodal mixture of gamma $Fe_2O_3$ (Hc of 180), colbalt-doped $Fe_2O_3$ (Hc of 400) and cobalt-based metal powder of the Cobaloy type (Hc of 1000) will not result in an effective trimodal recording system. Indeed, when the metal is replaced with a cobalt-doped powder having a coercivity of 900, the mixture is substantially unimodal. Similarly, if one combines (a) chromium dioxide, sold under the trade designation Croylin by E. I. DuPont de Nemours Company, and (b) gamma ferric oxide, such as is sold by Hercules Corporation under the trade designation HR 280, into an attempted bimodal formulation, then one obtains a unimodal result notwithstanding the fact that the former powder has a coercivity 547, the latter a coercivity of only 299. Again, the results apparently are caused by materials exhibiting substantial shape anisotropy ($Fe_2O_3$ both doped and non-doped, and chromium dioxide) change their coercivity in their interacting fields.

The nature of the magnetic interaction that produces this result is not known precisely. It was first suggested that substantial differences in powder density and/or Bm values should exist between at least two of the powders used in the system. For example, the metal particles illustrated herein ahve specific gravities of about 8.5 and a Bm value of from about 8,000 to 20,000 gauss, whereas the oxides have much lower specific gravity (about 4.4) and a much lower magnetic moment, typically about 3,000 to 4,000 gauss.

However, it is now believed that the particular advantages of the products of the invention are assignable to the use of at least one material, the coercivity of which is substantially free of influence by shape anisotropy. Thus, this particulate material should be one the coercivity of which is substantially controlled by magnetic crystalline anisotropy. It is important to realize that some magnetic iron oxides can exhibit such fredom from shape anisotropy, albeit they are not believed to be generally avalable in commerce. In the main, however, metal powders, i.e. those of Bm values exceeding about 8,000 gauss are the most advantageous for use in forming bimodal systems, in that they can be used successfully in combination wich acicular oxides and other acicular metal powders.

Acicular metal oxides, on the other hand, tend to interact one with the other in most convenient methods of practicing the invention, i.e. of making bimodal recording systems. However, it should be emphasized that it is possible to form bimodal systems of different oxides, say of cobalt-doped iron oxide and chromium dioxide, when care is taken to avoid interaction. Among the ways this can be accomplished is to place a thin insulating layer, say a layer of polymeric film of some other such spacer means between congruent layers of two oxides. In such a system, both of the oxides would conveniently be held in a polymer matrix. Also, it seems that a polymodal material can be formed if a material free of shape anisotropy is placed intermediate (in coercivity) to higher and lower acicular materials.

Some typical Bm values are: 3,400 for gamma $Fe_2O_3$, 4,000 black $Fe_3O_4$, about 16,000 for the cobalt metal powder of Example 1 below, and about 13,000 for the low-coercive force metal powder of Examples 2 and 3 below.

While emphasis is placed on use of different ferromagnetic powders to make polymodal recording systems, it should be stated, and will be obvious to those skilled in the art on their reading this description, that metal films of appropriate magnetic properties can be substituted for one or more, but not all, of the ferromagnetic powder components used in polymodal systems according to this invention. Indeed, use of such films is believed disadvantageous for almost every purpose.

ILLUSTRATIVE EXAMPLES OF THE INVENTION

In this Application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as maybe best suited in the condition of a particular case.

BRIEF DESCRIPTION OF THE DRAWINGS

FIGS. 15a through 15c/d are $\phi$/dt curves for gamma $Fe_2O_3$ (($H_c$=215 oersteds), $CrO_2$ ($H_c$=620 oersteds), and their mixture ($H_c$=390 oersteds), respectively.

FIG. 20a is a read output in mV as a function of write current in mA for the Bimodal A tape as compared to standard gamma ferric oxide tape.

FIG. 21 is a relative signal output voltage in dB for constant record current, as a function of bias current in dB, for the Bimodal A tape compared to standard gamma ferric oxide tape.

DESCRIPTION OF THE PREFERRED EMBODIMENT

Figure 1:
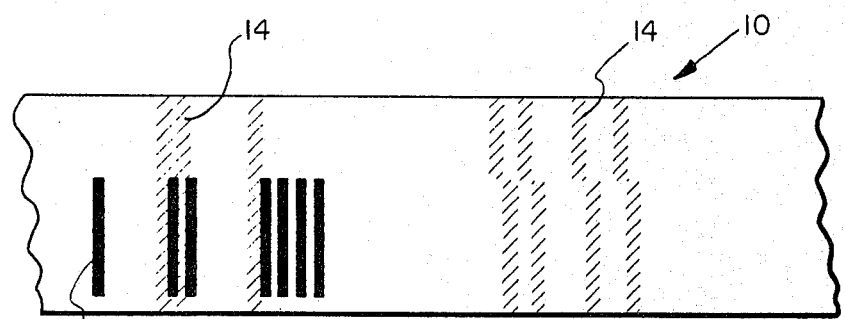
FIG. 1 is a diagrammatic representation of a credit card prepared according to the invention.

Referring to FIG. 1, it is seen that a credit card 10 comprises digital billing information pattern 12 and a noise pattern 14. Of course, these two overlapping patterns are not visible but merely represent magnetic states of a bimodal population of particulate magnetic powder.

Figure 2:
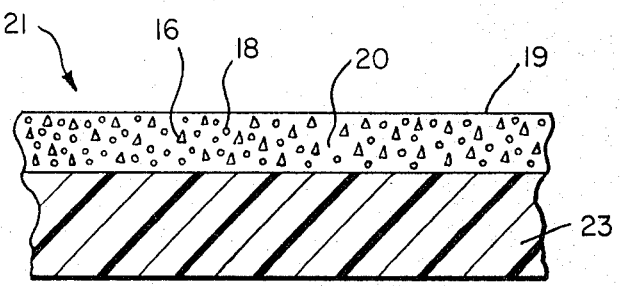
FIG. 2 is a section of one tape of a card using a bimodal mixture of magnetic particles.

FIG. 2 schematically shows the distribution of the higher coercivity magnetic material 16 and a lower coercivity magnetic material 18 in a segment 19 of a credit card 21. The magnetic materials are held in a polymeric matrix 20 as is known in the art and supported on a polymer-film substrate 23.

Figure 3:
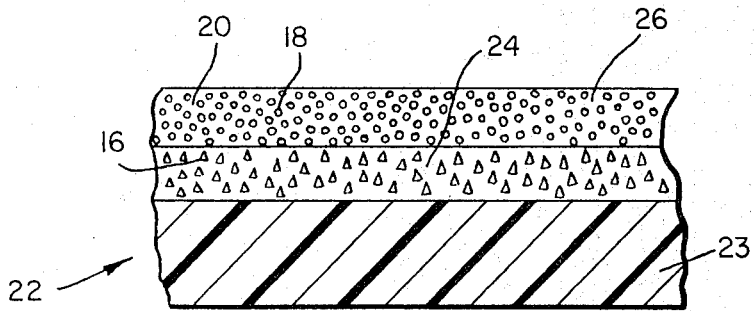
FIG. 3 is a section of another type of card showing a bimodal laminar arrangement of different magnetic powders.

FIG. 3 illustrates a card 22 having a similar construction but wherein the different magnetic populations are in separate layers, the higher coercivity material 16 being in the lower layer 22 and lower coercivity material 18 being in the upper layer 26.

Figure 4:
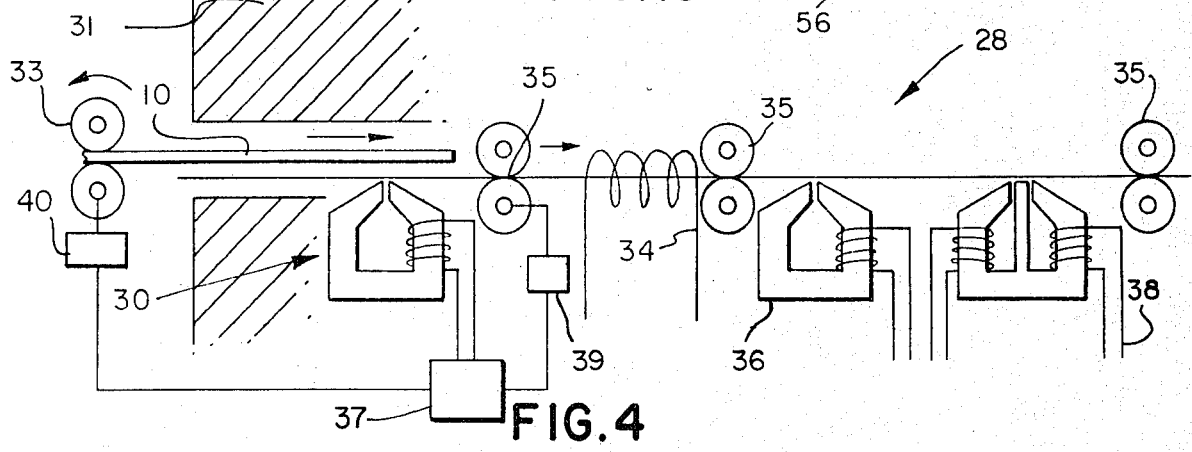
FIG. 4 is a schematic diagram showing one embodiment of a card vertifier and read apparatus.

FIG. 4 shows, diagrammatically, the arrangement of members in an apparatus 28 used to verify and read magnetic recording media of the invention.

Playback head 30 in housing 31 forms means to monitor the magnetic recording medium for the presence of a noise signal which has been imparted to the low coercivity powder population. If the signal is detected, advancement mechanism 35 is actuated. Erase coil 34 then erases the card 10 as it traverses therethrough. Data-recording head 36 reads the information imparted to the high coercivity material and the card continues through to the recording head 38 which re-records the noise signal on the card, thereby preparing it for future use. The card is carried into the apparatus by card-moving means 33 which is actuated by conventional means when a card is inserted into apparatus 28. If the noise signal is not sensed, amplifier and control circuit 37 will not actuate the motor 39 and consequently will not actuate the advancement mechanism 35. Thus, card 10 will not be carried beyond means 33. Circuit 37 will cause 2-way motor 40 to reverse and reject the card under this set of circumstances. The control circuits utilize known art, are not shown in the drawings in order to allow a clearer presentation of the invention.

Figure 6:
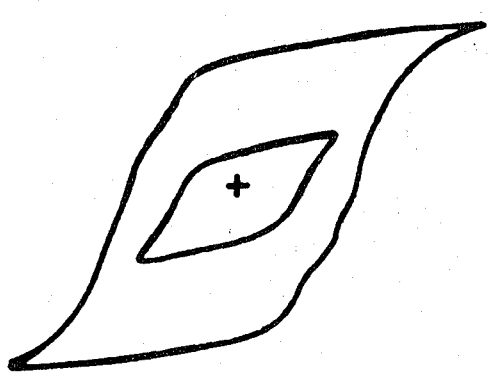

FIG. 6 is a BH loop (functional plot of M vs H for H symmetrically cyclic) showing the hysteresis loops of a ferromagnetic powder composition useful in the practice of the alloy powder having a coercivity of about 600 oersteds and an iron oxide (gamma $Fe_2O_3$) powder having a coercivity of about 350 oersteds. The inner loop is taken over a field of about 350 oersteds; the outer loop is taken over a field of about 1000 oersteds.

Figure 7:
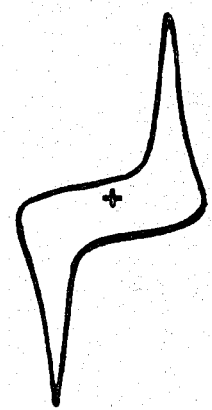

FIG. 7 is a non-integrated dM/dT vs H curve taken in a field of 300 oersteds and showing only the $Fe_2O_3$ switching.

Figure 8:
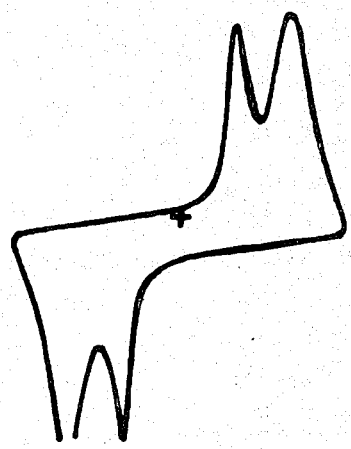

FIG. 8 is taken in a field of 650 oersteds and shown both materials switching.

Figure 5:
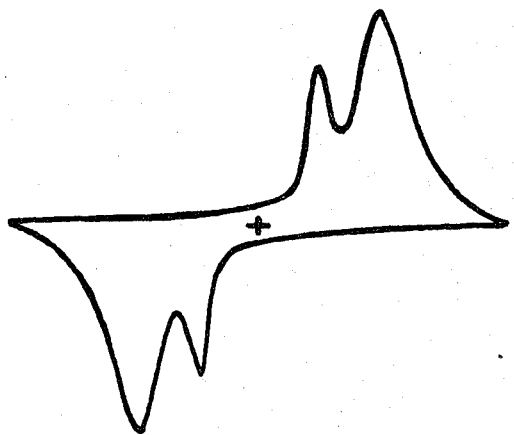

FIG. 5 is similar to FIG. 8 except it is taken in a field of 1000 oersteds.

Figure 13:
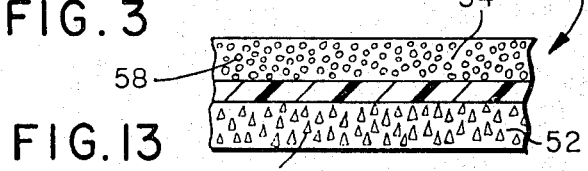
FIG. 13 is a schematic section of a magnetic recording medium constructed according to the invention.

FIG. 13 shows a bimodal tape 50 having high coercivity and low coercivity layers, 52 and 54 respectively, separated by backing. The layers are conveniently formed with cobalt-doped iron oxide 56 and chromium dioxide 58, respectively.

In examining these loops, one should keep in mind that the "B-H" loop displayed is a display of $\phi(t)$ vs H(t), where O is the flux, H is the field, and t is the time. Thus, when we differentiate, we take the differential of $\phi(t)$ with respect to time, when what we really want to see is $d\phi/dH$. Of course, $$\frac{d\phi}{dt} = \frac{d\phi}{dH} \cdot \frac{dH}{dt}$$

and if dH/dt is constant with respect to time, it can be ignored. In this case, H is a sinusoidal function of time, making dH/dt a cosine function of time. This cosine function which is equal to one at H=O and equal to zero at $H=H_m$ must always be kept in mind when comparing heights of the pulses. In other words, these figures are not isomorphic with figures where dH/dt is a constant.

Figure 14:
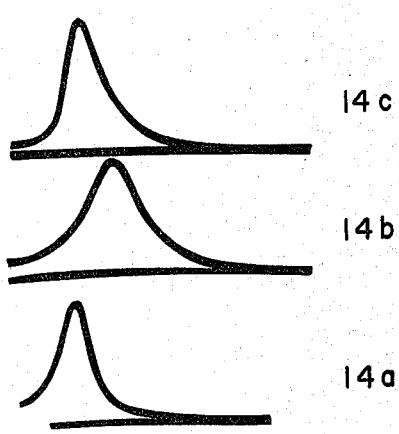
FIGS. 14a through 14c are d $\phi$/dt curves for $CrO_2$ (Hc=660 oersteds), cobalt-doped gamma iron oxide ($H_c$=1060 oersteds), their mixutre ($H_c$=795 oersteds) respectively.
Figure 15:
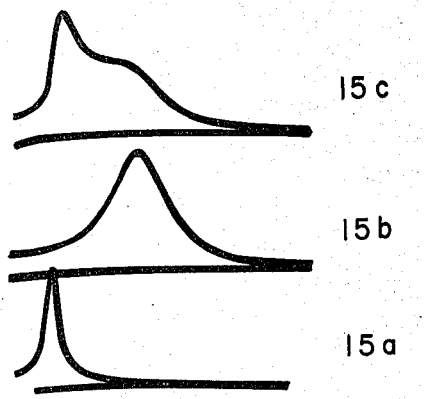
Figure 16:
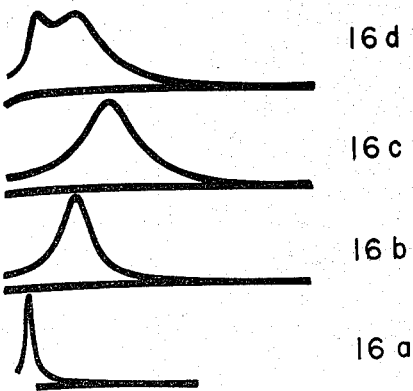
FIGS. 16a through 16c/d are $\phi$/dt curves for gamma $Fe_2O_3$ (215 oersteds $H_c$), $CrO_2$ (660 oersteds), cobalt-doped gamma iron oxide (1060 oersteds), and their mixture ($H_c$=620 oersteds), respectively.
Figure 17:
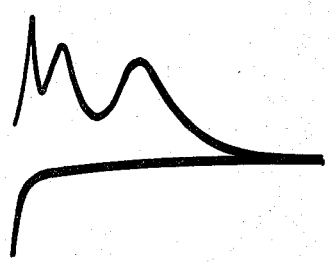
FIG. 17 is a d $\phi$/dt curve for trimodal sample. $H_m$ is 3000 oersteds.

The kind of results one normally finds in a blend are shown in FIG. 14. These traces are half of the differentiated loop showing the dO/dt pulses as a function of field. Field increases to the right, and the traces start at H=O. FIG. 14a is $CrO_2$, FIG. 14b is a cobalt-doped gamma-$Fe_2O_3$, and FIG. 14c is from a 1:1 by weight blend of the two. The coercivities of the three materials are 660 oersteds, 1060 oersteds, and 795 oersteds respectively. Note the smooth blending of the materials, evidently caused by a large amount of magnetic interaction. FIG. 15 shows a low-$H_c$ large particle gamma, the same $CrO_2$, and their mixture. The blending is not quite so pronounced here, but there is no useful separation of modes. When all three are blended (FIG. 16) we see about as much of a split as is ever seen with acicular oxide materials. In contrast, when a 60/20/20 cobalt-/iron/nickel alloy particle is mixed, with itself of with oxide materials, the results generally are as shown in FIG. 17.

Figure 18:
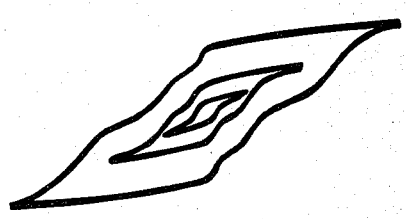
FIG. 18 is a stepwise expansion of the hysteresis loops of a trimodal materia. $H_m$ for loops is 700 oersteds, 1500 oersteds, and 3000 oersteds.

The materials here are a 180 oersteds and a 1000 oersteds 60/20/20 alloy mixed with a 330 oersteds gamma. There is little interaction, and the pulses are mostly just adding together. The stepwise expansion of the hysteresis loop of this material with maximum applied field is shown in FIG. 18.

Figure 19:
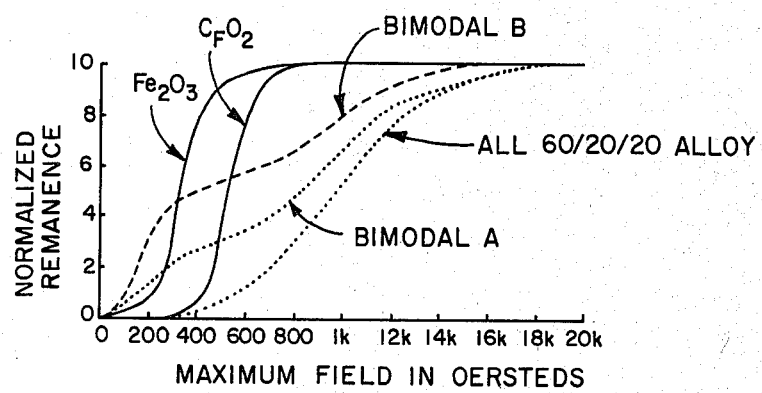
FIG. 19 shows normalized saturation remanence curves for a cyclic applied field as a function of maximum applied field. The two bimodal tapes are compared to standard gamma ferric oxide, chromium dioxide, and a 60/20/20, CO/Ni/Fe alloy tape.
Figure 20:
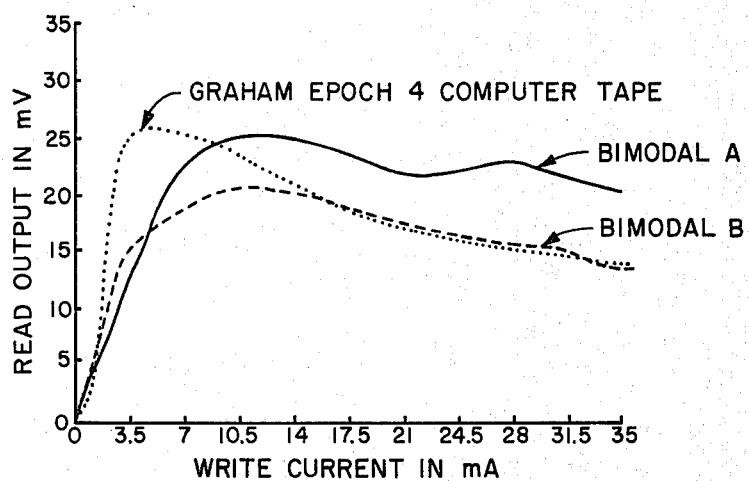
FIG. 20 shows a curve relating the write current in milliamps to the read output in millivolts for various bimodal products of the invention. Note one curve exhibits distinct peaks using the write current abscissa as a base line from which such peaks are measured.
Figure 21:
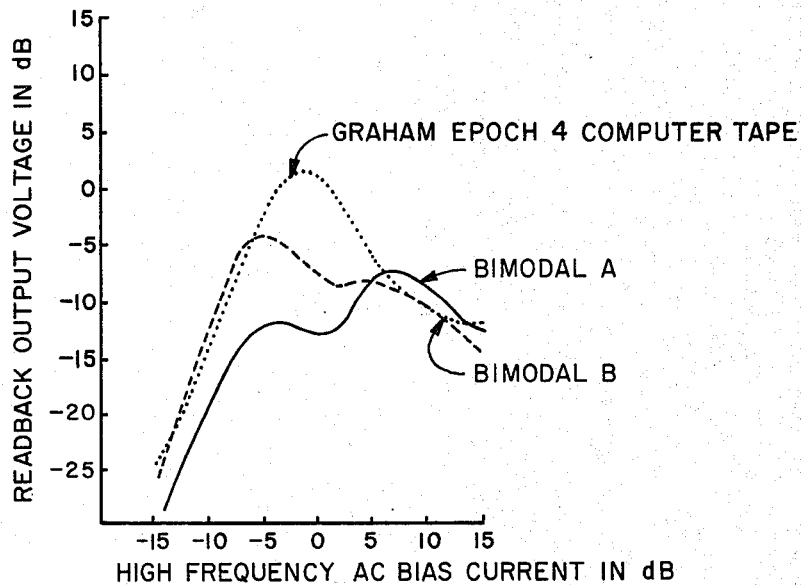
In FIG. 21, using a bias current, both materials exhibit plural peaks.

To simplify things, only bimodal tapes are examined here. Two tapes were made using a 200 oersteds gamma iron oxide mixed with an 800 oersteds 60/20/20 cobalt-/nickel/iron metal powder material. Tape "A" used a weight ratio of 1:56:1 of metal to oxide. These are compared with available tapes using $CrO_2$, gamma-$Fe_2O_3$ and all-metal powder. The all-metal powder tape chosen had an unusually wide $d\phi/dt$ pulse, and it can be considered to be a material with a distributed $H_c$. FIG. 19 shows plots of the normalized saturation remanence vs field for these tapes. Note the steps in the curves of the bimodal tapes. Curves of digital output pulse height vs drive current show two maxima rather than the single one usually seen. In FIG. 20 and FIG. 21 the curves of the gamma-$Fe_2O_3$ tape are shown in comparison. This indicates a proper choice of materials would give a multimodal tape insensitive to bias or write current over a fairly wide range of values.

Figure 22:
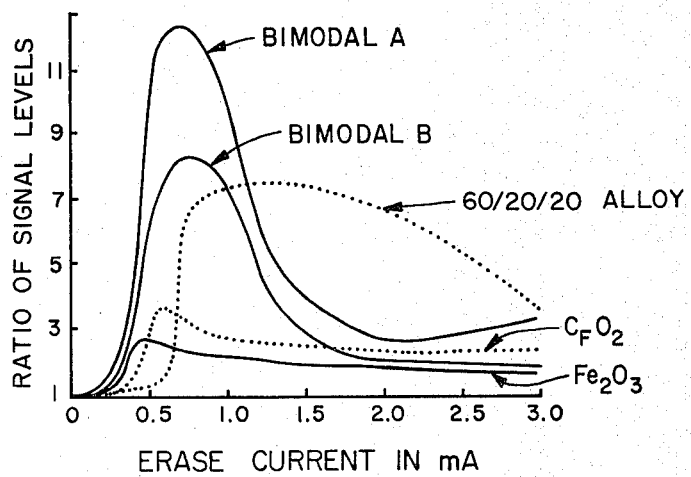
FIG. 22 is a ratio of the "High Mode Biased" signal to the "Low Mode Biased" signal for partically erased tapes. In the case of the bimodal tapes, the high mode signal had been erased less than 3 dB at the peak of the curves.

To demonstrate the sequential erasibility of the bimodal tapes, a 2.75 mil (95.3 micron) wavelength signal was recorded using bias appropriate for the high mode. On a second pass, a 15 mil (380 micron) signal was recorded, using bias appropriate for the low mode. The two bias levels were $+7$ dB and $-4$ dB on the scale used for FIG. 21. Similar recordings were made on the unimodal tapes, arbitrarily selecting bias levels $=8$ and $-3$ dB from their particular maximum sensitivity bias levels. Selective erasure was done by varying bias current through the record head. The difference between the levels of the two signals is plotted in FIG. 22. In each case, the high mode signal had experienced no more than about 3 dB or erasure at the peak of the curves. The Bimodal A tape lost only 2 dB of high mode signal at this point. Clearly, there will be an optimum ratio of high mode material to low material for maximum erasure difference. The range of erase current for selective erasure is not very large for the bimodal materials—a condition favorable for maximum security when the low mode signal is used for masking the information in the high mode signal. The "distributed coercivity" of the selected 60/20/20 alloy-powder-containing tape is most clearly seen in this figure.

EXAMPLE 1

A cobalt metal powder lacking any substantial shape anisotropy was selected which has the following characteristics:

| Coercive Force: | 1010 at 25° C. |
|---|---|
| | 1380 at $-196°$ C. |

Such a series of such powders having difference coercivities are available from the Cobaloy Division of Graham Magnetcs, Inc., under the trade designation Cobaloy.

A quantity of 100 grams of the powder is mixed into a solution consisting of 67.5 grams of a polyurethane resin known as Estate 5707, and 380 grams of tetrahydrofuran. The resulting composition is mixed in a shaker mill with ⅛ inch stainless steel shot for about 20 minutes. Thereupon 10 grams of soya lecithin was added and mixed until dissolved. A quantity of 200 grams of iron oxide (high shape-anisotropy) sold under the trade designation HR 280 by Hercules Corporation and characterized by a coercive force of about 280. This material is mixed into the cobalt-bearing composition. Then the composition is warmed sufficiently to drive off 200 grams of tetrahydrofuran.

The composition is then ball-milled (using ⅜ inch stainless steel balls) for about 17 hours before being coated in a strip on a release paper substrate and dried. The coating is dried, then the paper is cut into 0.25 inch strips. These strips are fastened, adhesively or by heat-sealing, to credit card stock.

A card, so formed, is recorded with a recording head, sold under the Trademark Spinalloy by Spin Physics of San Diego, Calif. A 3000-oersted field is used, and the pattern is representative of digital information commonly used for billing purposes by credit-card issuing people. After being so-recorded the card is erased with a 300 oersted AC field to assure that the iron-oxide component is reasonably clear of any signal. A noise pattern is then recorded (with a 300 oersted field) on the iron oxide.

Thus prepared, the card is ready for use by a customer.

EXAMPLE 2

A trimodal powder composition was prepared from the following ferromagnetic powders:

| Weight % | Coercivity | Powder Identity |
|---|---|---|
| 10 | 125 | FeMnNiCo Cobaloy powder |
| 20 | 330 | iron oxide* |
| 70 | 1000 | Example 1, cobalt-based |

*available under the trade designation Mo2228 from Charles Pfizer Company

Only the iron oxide exhibits substantial shape anisotropy. The example illustrates the desirability of using such a material only when the adjacent mode is a material which does not have any substantial shape anisotropy.

FIGS. 9 through 12 illustrate this response of a trimodal ferromagnetic system to magnetic fields of different magnitudes.

Figure 9:

FIG. 9 shows a non-integrated dM/dt curve taken in a field of 300 oersteds. The FeMnNiCo powder is switching in this field.

Figure 10:
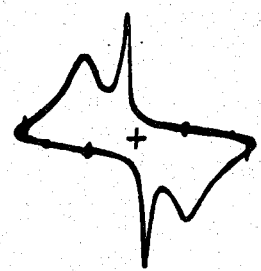

FIG. 10 shows the iron oxide material switched as the field goes to 1000 oersteds.

Figures 11, 12:
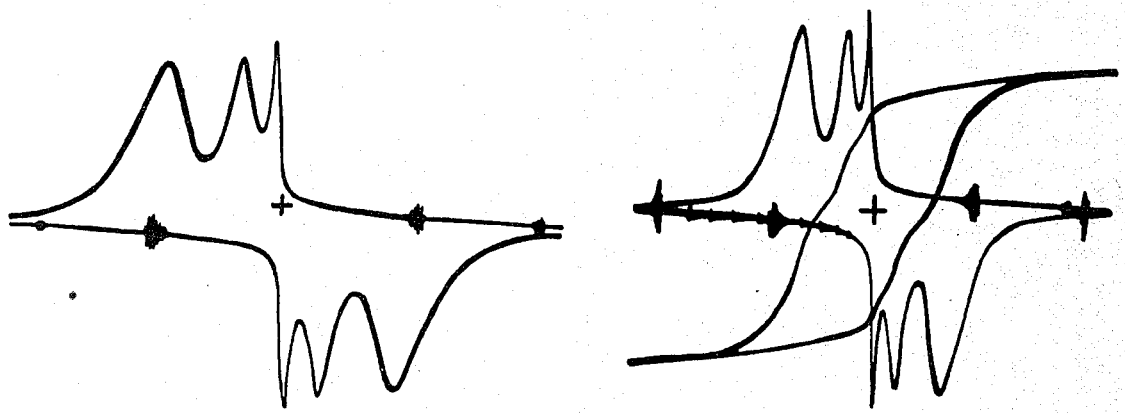
FIGS. 15 through 12 represent some characteristic magnetic property curves of the compositions utilized in the invention.

FIG. 11 illustrates all of the powder populations switched.

FIG. 12 shows an integrated hysteresis loop superimposed on a non-integrated dM/dt curve as shown in FIG. 11.

The composite drawings of the hysteresis loops and non-integrated dM/dt curves were prepared from photographs of oscilloscope curves which were taken as follows: The magnetic field to which the system being tested was subject, is set at 1650 oersteds. The height of the BH curve (the B value) was adjusted arbitrarily until it was 6 scale units high. A photograph was then taken of the normal hysteresis curve. The apparatus was then swiched so the oscilloscope showed the non-integrated dM/dt curve and the attenuator was cut down by a factor of five. Then the photograph of the dM/dt curves were taken as a double exposure.

EXAMPLE 3

A composition was prepared from Powders 1 and 2 of FIG. 3. It was tested and found to be bimodal. Thus, it is seen that undesirable magnetic interaction is seen primarily in systems using a plurality of metal oxide populations. (The commercially available iron oxides and chromium dioxides are all acicular meterials exhibiting a high degree of shape anisotropy. This is also true for most cobalt-doped iron oxides.) Use of a plurality of high-density, i.e. predominantly metal powders of appropriate coercivity differences appears to be appropriate in manufacture of polymodal magnetic recording systems.

Orientation of the acicular particles during the manufacture of the tape, e.g. by use of a magnetic field applied after the powder-bearing coating is applied to the substrate, and as is known to the art, enhances polymodal characteristics of the product.

In general, the peaks visible on a non-integrated dM/dt curve of an advantageous polymodal system can usually be recognized in two ways:

1. As one raises the field on a BH meter the lower-coercivity curves will be substantially complete before the appearance of the next higher curve.

2. The valleys between adjacent peaks are advantageously of a depth equal to at least one-half of the average height of the adjacent peaks over a base line.

Polymodal recording members of the type described herein are new. The name has been selected to describe a device which has the ability to carry at least two independently-functioning magnetic signals in a given plane (e.g. in a given coating containing two different ferromagnetic powder populations) or in proximate and congruent planes (e.g. in adjacent layers of ferromagnetic materials or two such layers that are separated by a thin sheet of barrier material.)

The above-described examples disclose bimodal systems which are not only advantageously polymodal in the functional sense, but are also advantageous in that they are formed of magnetic materials which do not have extraordinary ratios of coercivity measured at different axis. The exemplified materials have ratios from any harder axis to any soft axis of about 1.25 or less. Moreover, the devices disclosed herein can be used with conventional state of the art erasing means because magnetic fields of markedly different directional parameters are not required for erasing each mode.

It will thus be seen that the objects, as set forth above, are among those made apparent from the preceding description, are efficiently attained and, since certain changes may be made in carrying out the above method without departing from the scope of the invention, it is intended that all matter contained in the above description shall be interpreted as illustrative and not in a limiting sense.

What is claimed is:

1. A polymodal ferromagnetic powder composition formed of at least two populations of ferromagnetic particles of substantially different coercivities wherein a first said population is so selected that it can be magnetically switched at a magnetic field intensity at which a second population of said composition is not switched wherein no two populations adjacent each other, with respect to coercivity value, will both have their coercivity substantially influenced by shape anisotropy; and wherein each said ferromagnetic particle population is a material characterized by a maximum coercivity ratio of about 1.5:1 between different axes of said particle population and wherein a nonintegrated dM/dt curve of the magnetic powder formed of said populations will exhibit a valley between two adjacent peaks equal to at least one-half the average distance from the base line to top of said two peaks.

2. A product formed of the composition as defined in claim 1 wherein said coercivity of the first population is below about 400 and the coercivity of said second population is above about 600.

3. A product formed of the composition as defined in claim 1 wherein said first population is selected from iron-oxide powder or chromium oxide powder.

4. A product formed of the composition as defined in claim 3 wherein the Bm value of at least one said ferromagnetic material is above 8,000 gauss.

5. A product formed of the composition as defined in claim 3 wherein said populations are intimately mixed with one another and with an organic binder system.

6. A product formed of the composition as defined in claim 1 wherein the Bm value of at least one said ferromagnetic material is about 8,000 gauss.

7. A product formed of the composition as defined in claim 6 wherein there is a third population of ferromagnetic material that can be either switched or erased without substantial effect on either of the first or second said populations.

8. A product formed of the composition as defined in claim 1 wherein said populations are intimately mixed with one another and with a polymeric binder system.

9. A product formed of the composition as defined in claim 1 wherein said composition is mounted on the surface thereof.

10. A product formed of the composition as defined in claim 1 wherein there is a third population of ferromagnetic material that can be either switched or erased without substantial effect on either of the first or second said populations.

11. In an article comprising a ferromagnetic coating composition, said article adapted to be processed in a magnetic field to receive a pattern which pattern can be sensed by a magnetic reading head, the improvement wherein said ferromagnetic composition comprises at least two different populations of ferromagnetic material intermixed within a matrix, each of said populations forming means to store, independently from one another, magnetically-recorded information and wherein a first said population is so selected that it can be magnetically switched at a magnetic field intensity at which a second said population of said composition is not affected; and wherein no two populations adjacent each other, with respect to coercivity value, will both have their coercivity substantially influenced by shape anisotropy; and wherein each said ferromagnetic particle population is a material characterized by a maximum coercivity ratio of about 1.5:1 between different axes of said particle population; and wherein a non-integrated dM/dt curve of the magnetic powder formed of said populations will exhibit a valley between two adjacent peaks equal to at least one-half the average distance from the base line to top of said two peaks.

12. An article as defined in claim 11 wherein at least one said ferromagnetic material is a metal powder.

13. An article as defined in claim 11 wherein said coercivity of the first population is below about 400 and the coercivity of said second population is above about 600.

14. An article as defined in claim 11 wherein said first population is selected from iron-oxide powder or chromium oxide powder.

15. An article as defined in claim 14 wherein the Bm value of at least one said ferromagnetic material is above 8,000 gauss.

16. An article as defined in claim 11 wherein the Bm value of at least one said ferromagnetic material is above 8,000 gauss.

17. An article as defined in claim 16 wherein there is a third population of ferromagnetic material that can be either switched or erased without substantial effect on either of the first or second said populations.

18. An article as defined in claim 11 wherein said composition is mounted on the surface thereof.

19. An article as defined in claim 11 wherein there is a third population of ferromagnetic material that can be either switched or erased without substantial effect on either of the first or second said populations.

20. In an article comprising a ferromagnetic component adapted to be processed in a magnetic field to receive a pattern which pattern can be sensed by a magnetic reading head, the improvement wherein
said ferromagnetic component comprises at least two different populations of ferromagnetic powder material each of said populations forming means to store, different magnetically-recorded information; wherein a first said population is so selected that it can be magnetically switched at a magnetic field intensity at which a second said population of said component is not affected; and wherein
different populations are contained in different layers, and wherein a non-integrated dM/dt vs H curve of the magnetic powder formed of said populations will exhibit a valley between two adjacent peaks equal to at least one-half the average distance from the base line to top of said peaks.

21. An article as defined in claim 20 wherein at least one population has its coercivity substantially free of the effect of shape anisotropy.

22. An article as defined in claim 21 wherein said first population is selected from iron-oxide powder of chromium oxide powder.

23. An article as defined in claim 22 wherein the Bm value of at least one said ferromagnetic material is above 8,000 gauss.

24. An article as defined in claim 20 wherein said coercivity of the first population is below about 400 and the coercivity of said second population is about about 600.

25. An article as defined in claim 24 wherein said first population is selected from iron-oxide powder of chromium oxide powder.

26. An article as defined in claim 24 wherein the Bm value of at least one said ferromagnetic material is above 8,000 gauss.

27. An article as defined in claim 20 wherein the Bm value of at least one said ferromagnetic material is above 8,000 gauss.

* * * * *

UNITED STATES PATENT AND TRADEMARK OFFICE
CERTIFICATE OF CORRECTION

PATENT NO. : 4,281,043
DATED : July 28, 1981
INVENTOR(S) : Robert J. Deffeyes

It is certified that error appears in the above-identified patent and that said Letters Patent are hereby corrected as shown below:

Column 7, line 56 - Change "wich" to --with--;

Column 8, line 46 - Change "Figures 15-12" to --Figures 5-12--;

Column 10, line 54 - Change "itself of with" to --itself or with--;

Column 10, line 67 - Change "1:56:1" to --1.56:1.

Signed and Sealed this

Twenty-fourth Day of November 1981

[SEAL]

Attest:

GERALD J. MOSSINGHOFF

Attesting Officer

Commissioner of Patents and Trademarks